(12) United States Patent
Cho et al.

(10) Patent No.: US 9,081,496 B2
(45) Date of Patent: Jul. 14, 2015

(54) MOBILE TERMINAL AND METHOD OF CONTROLLING OPERATION OF THE MOBILE TERMINAL

(75) Inventors: Seonhwi Cho, Seoul (KR); Yeonjoo Kang, Seoul (KR); Jinhyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 13/085,312

(22) Filed: Apr. 12, 2011

(65) Prior Publication Data

US 2011/0252362 A1 Oct. 13, 2011

(30) Foreign Application Priority Data

Apr. 13, 2010 (KR) .................. 10-2010-0033863
Jun. 14, 2010 (KR) .................. 10-2010-0056082

(51) Int. Cl.
 | | |
 |---|---|
 | *G06F 3/048* | (2013.01) |
 | *H04W 88/02* | (2009.01) |
 | *G06F 3/0488* | (2013.01) |
 | *G06F 3/0485* | (2013.01) |
 | *G06F 3/0482* | (2013.01) |

(52) U.S. Cl.
 CPC .......... *G06F 3/04883* (2013.01); *G06F 3/0482* (2013.01); *G06F 3/0485* (2013.01)

(58) Field of Classification Search
 CPC .......... G06F 3/048; H04W 88/02; G09G 5/00
 USPC .................. 715/784, 864; 345/162, 173, 174
 See application file for complete search history.

(56) References Cited

U.S. PATENT DOCUMENTS

| | | | | |
|---|---|---|---|---|
| 8,584,027 | B2* | 11/2013 | Quennesson et al. ......... | 715/763 |
| 2003/0043198 | A1* | 3/2003 | Delpuch ....................... | 345/784 |
| 2007/0132789 | A1* | 6/2007 | Ording et al. ................ | 345/684 |
| 2007/0277126 | A1* | 11/2007 | Park et al. ..................... | 715/866 |
| 2008/0259041 | A1* | 10/2008 | Blumenberg et al. ......... | 345/173 |
| 2009/0012952 | A1* | 1/2009 | Fredriksson ..................... | 707/5 |
| 2009/0085878 | A1* | 4/2009 | Heubel et al. ................. | 345/173 |
| 2009/0228825 | A1* | 9/2009 | Van Os et al. ................ | 715/780 |
| 2009/0322689 | A1* | 12/2009 | Kwong et al. ................ | 345/173 |
| 2010/0164895 | A1* | 7/2010 | Kim et al. ..................... | 345/173 |
| 2010/0214237 | A1* | 8/2010 | Echeverri et al. ............. | 345/173 |
| 2011/0080351 | A1* | 4/2011 | Wikkerink et al. ............ | 345/173 |
| 2011/0087990 | A1* | 4/2011 | Ng et al. ....................... | 715/773 |
| 2011/0202859 | A1* | 8/2011 | Fong ............................ | 715/769 |

OTHER PUBLICATIONS

UCSB ScienceLine: Does the amont of stretch of a rubber band affect the distance a rubber band will travel?*

* cited by examiner

*Primary Examiner* — William Bashore
*Assistant Examiner* — Jeanette J Parker
(74) *Attorney, Agent, or Firm* — Birch, Stewart, Kolasch & Birch, LLP

(57) ABSTRACT

A mobile terminal and a method of controlling the operation of the mobile terminal are provided. The method of one embodiment includes displaying an electronic document on a display module; responsive to detecting a scroll command, scrolling the electronic document in a particular direction at a particular speed; and changing a speed of scrolling the electronic document upon encountering a scroll limit during the scrolling of the electronic document. Therefore, it is possible to set a scroll limit in an electronic document and thus to automatically slow down or stop the scrolling of the electronic document upon encountering the scroll limit.

13 Claims, 18 Drawing Sheets

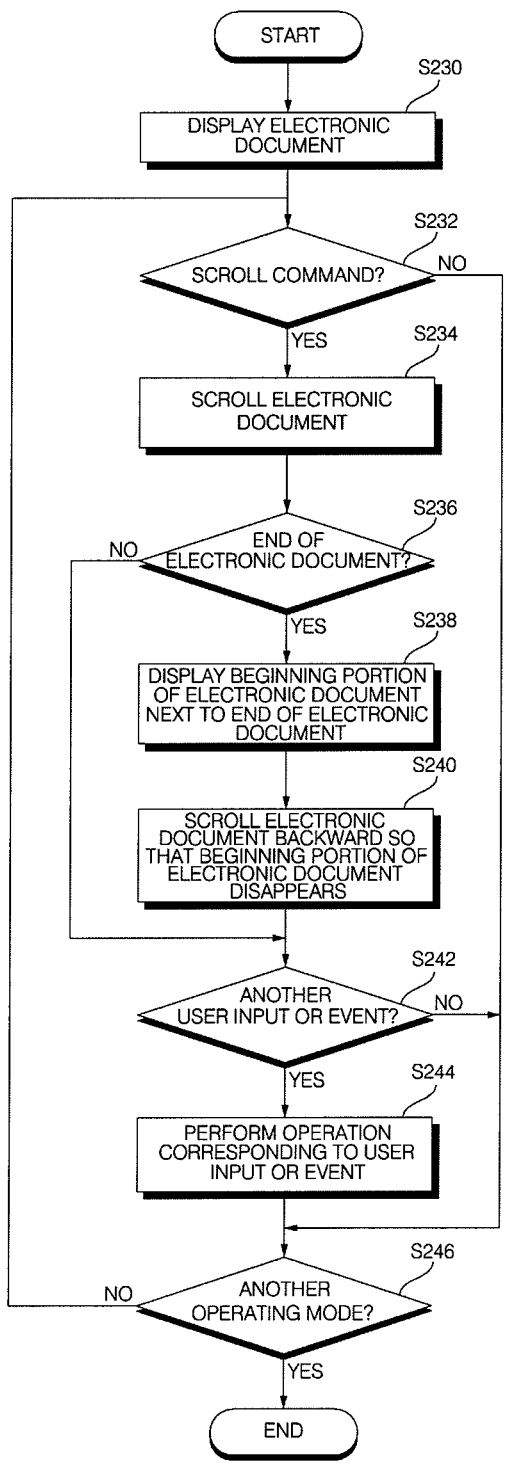

(a)    (b)

(a)   (b)

FIG. 16
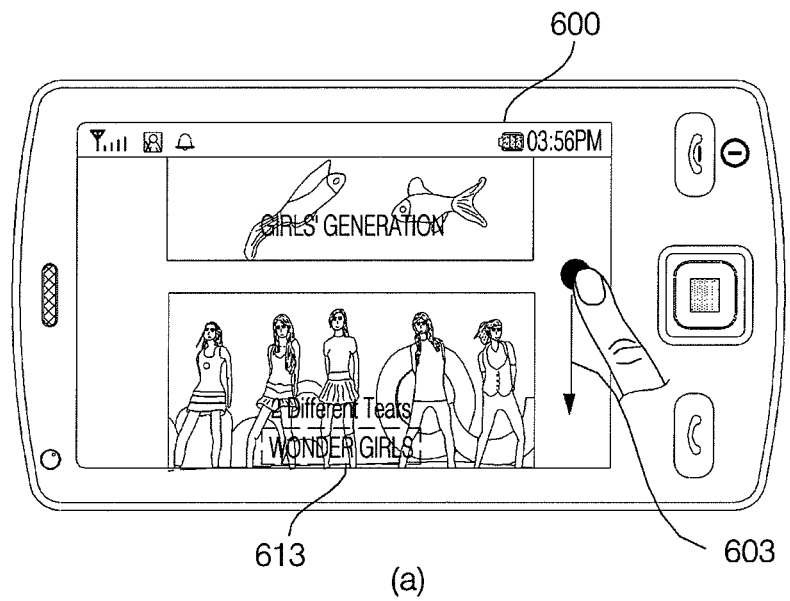
(a)
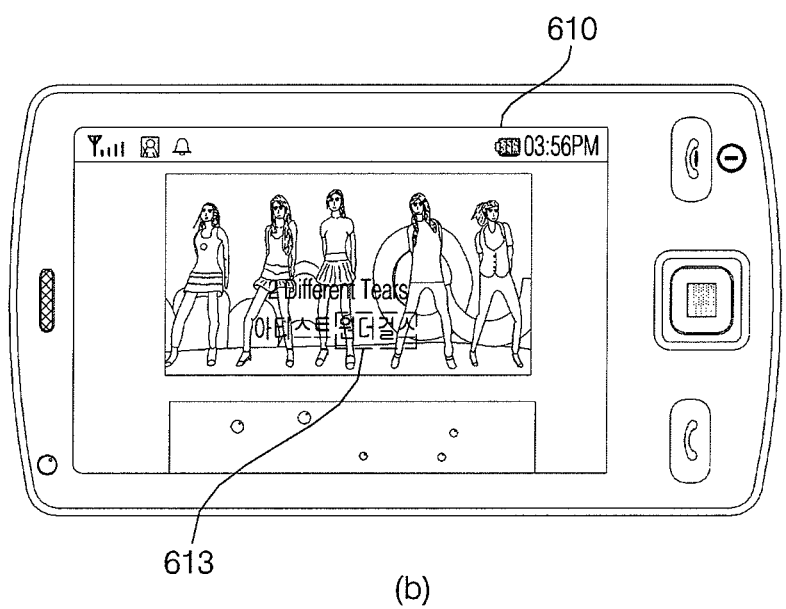
(b)

FIG. 17
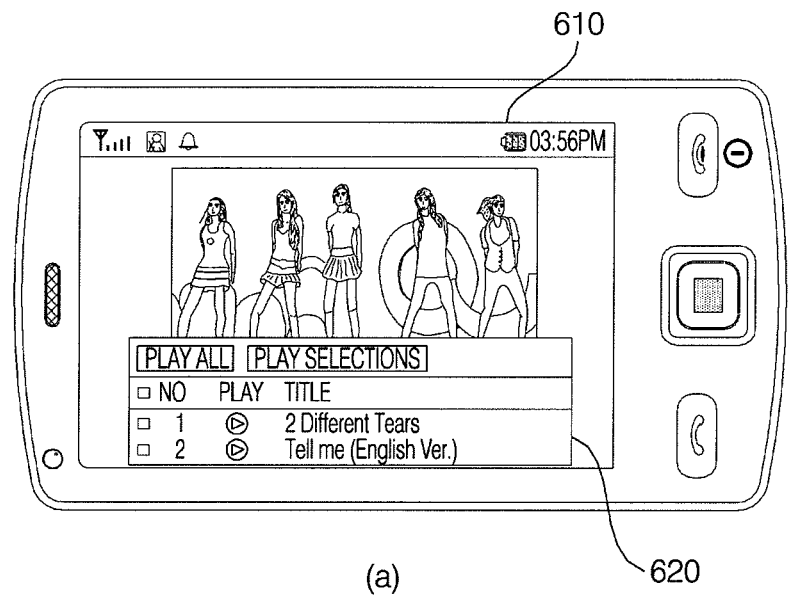
(a)
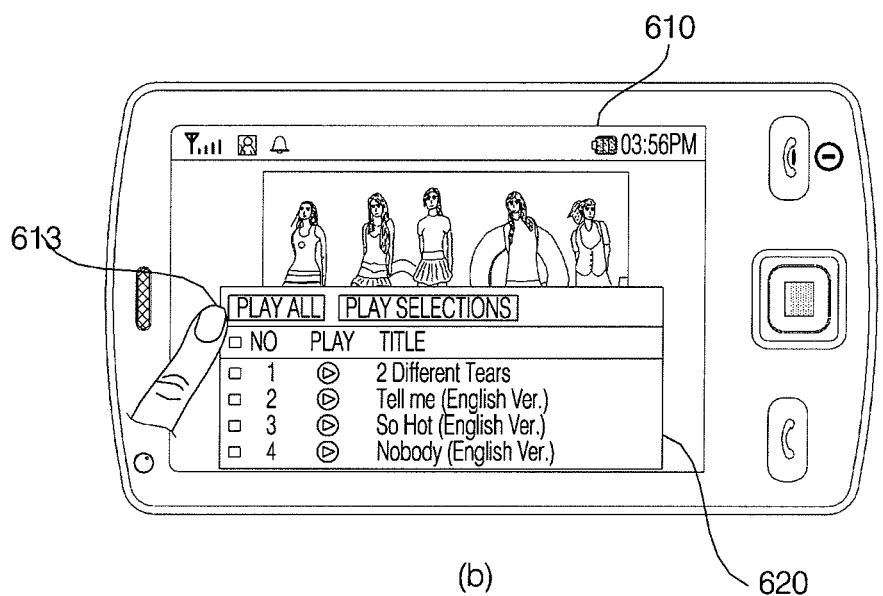
(b)

MOBILE TERMINAL AND METHOD OF CONTROLLING OPERATION OF THE MOBILE TERMINAL

CROSS-REFERENCE TO RELATED APPLICATION

This application claims the priority benefit of Korean Patent Application No. 10-2010-0033863, filed on Apr. 13, 2010, and No. 10-2010-0056082, filed on Jun. 14, 2010 in the Korean Intellectual Property Office, the disclosures of which are incorporated herein by reference.

BACKGROUND OF THE INVENTION

1. Field of the Invention

The present invention relates to a mobile terminal and a method of controlling the operation of the mobile terminal, and more particularly, to a mobile terminal and a method of controlling the operation of the mobile terminal, in which a scroll limit can be set in an electronic document so that the scrolling of the electronic document can automatically slow down or even stop upon encountering the scroll limit.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless interne services and have thus evolved into multimedia players.

Various attempts have been made to realize such complicated functions as hardware devices or software programs. However, there is a limit in allocating sufficient space for a UI such as a display or a keypad without compromising the mobility and the portability of the mobile terminal. In addition, since the size of display screens that can be displayed on mobile terminals is generally limited, electronic documents or webpages often cannot be displayed as a whole on mobile terminals, and thus can be navigated through by scrolling. Users can easily scroll an electronic document or a webpage displayed on a touch screen simply by touching and dragging or touching and flicking on the touch screen using fingers or a touch pen.

However, since touch-and-drag scrolling is characterized by scrolling an electronic document only by an amount by which the electronic document is dragged, users are often required to perform a plurality of touch-and-drag gestures in a row at high speed to scroll through, for example, a long list. On the other hand, touch-and-flick scrolling can scroll through even long lists quickly, but can easily scroll past desired selections by mistake.

SUMMARY OF THE INVENTION

The present invention provides a mobile terminal and a method of controlling the operation of the mobile terminal, in which a scroll limit can be set in an electronic document so that the scrolling of the electronic document can automatically slow down or even stop upon encountering the scroll limit.

According to an aspect of the present invention, there is provided a method of controlling the operation of a mobile terminal, the method including displaying an electronic document on a display module; responsive to detecting a scroll command, scrolling the electronic document in a particular direction at a particular speed; and changing a speed of scrolling the electronic document upon encountering a scroll limit during the scrolling of the electronic document.

According to another aspect of the present invention, there is provided a mobile terminal including a display module configured to display an electronic document thereon; and a controller configured to, if a scroll command is received, scroll the electronic document in a particular direction at a particular speed in response to the scroll command and change a speed of scrolling the electronic document upon encountering a scroll limit.

According to another aspect of the present invention, there is provided a method of controlling the operation of a mobile terminal, the method including displaying an electronic document on a display module; responsive to detecting a scroll command, scrolling the electronic document in a first direction; displaying a beginning portion of the electronic document next to an end portion of the electronic document upon encountering an end of the electronic document during the scrolling of the electronic document in the first direction; and if the scroll command is no longer detected, scrolling the electronic document in a second direction so that the beginning portion of the electronic document can disappear from the display module.

According to another aspect of the present invention, there is provided a mobile terminal including a display module configured to display an electronic document thereon; and a controller configured to, if a scroll command is detected, scroll the electronic document in a first direction in response to the scroll command, and display a beginning portion of the electronic document next to an end portion of the electronic document upon encountering an end of the electronic document during the scrolling of the electronic document in the first direction, wherein, if the scroll command is no longer detected, the controller scrolls the electronic document in a second direction so that the beginning portion of the electronic document can disappear from the display module.

According to another aspect of the present invention, there is provided a method of controlling the operation of a mobile terminal, the method including displaying an electronic document on a display module; responsive to detecting a scroll command, scrolling the electronic document in a first direction; and upon encountering a predefined item during the scrolling of the electronic document, realigning the electronic document around the predefined item by scrolling the electronic document in a second direction.

According to another aspect of the present invention, there is provided a mobile terminal including a display module configured to display an electronic document thereon; and a controller configured to, if a scroll command is detected, scroll the electronic document in a first direction in response to the scroll command, wherein, upon encountering a predefined item during the scrolling of the electronic document, the controller realigns the electronic document around the predefined item by scrolling the electronic document in a second direction.

BRIEF DESCRIPTION OF THE DRAWINGS

The above and other features and advantages of the present invention will become more apparent by describing in detail preferred embodiments thereof with reference to the attached drawings in which:

FIG. 5 is a flowchart illustrating a method of controlling the operation of a mobile terminal, according to a second exemplary embodiment of the present invention;

FIGS. 16 and 17 are diagrams illustrating how to control an operation of a mobile terminal on a webpage screen according to an embodiment of the invention;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
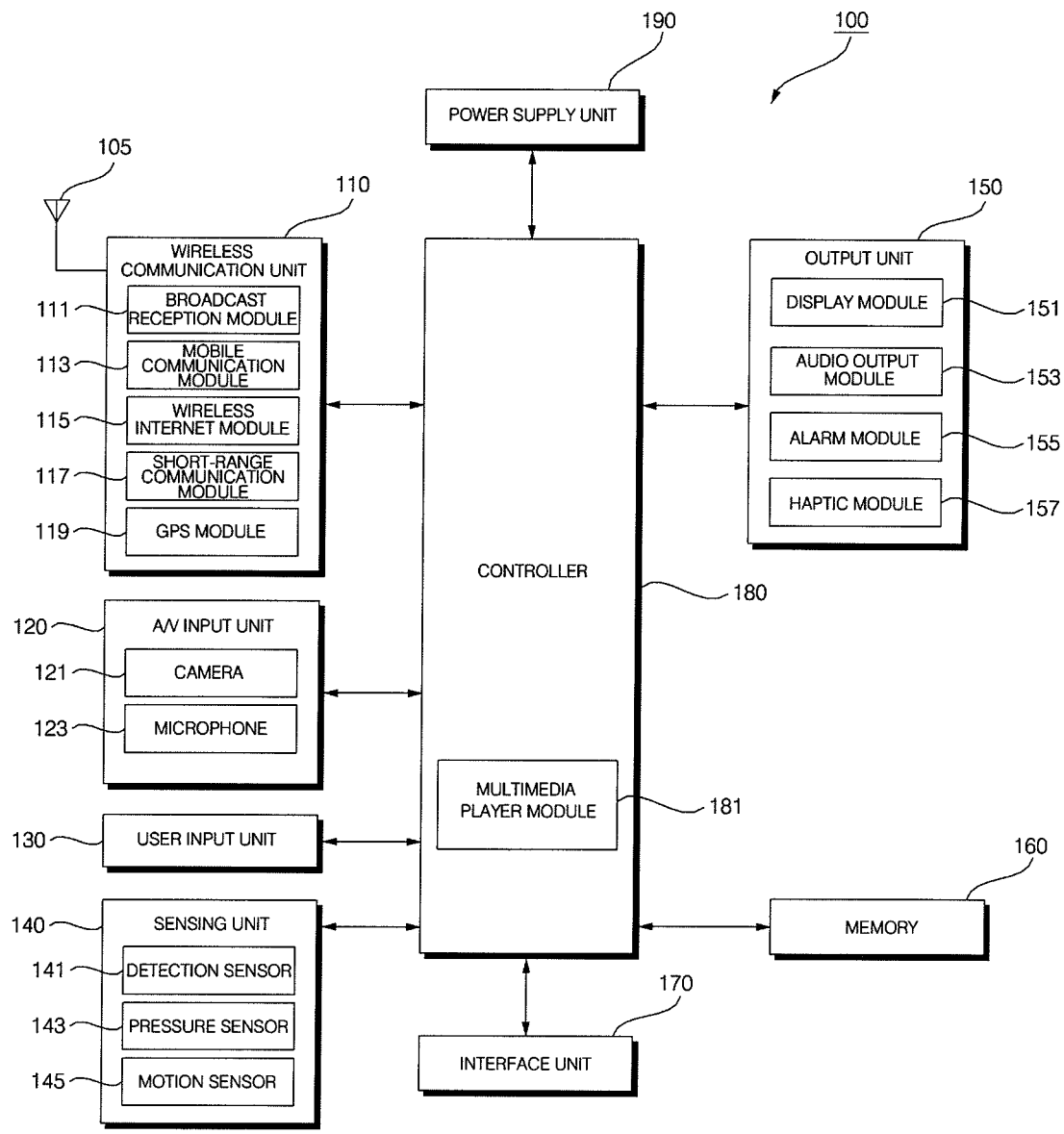
FIG. 1 is a block diagram illustrating a mobile terminal according to an exemplary embodiment of the present invention.

FIG. 1 is a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
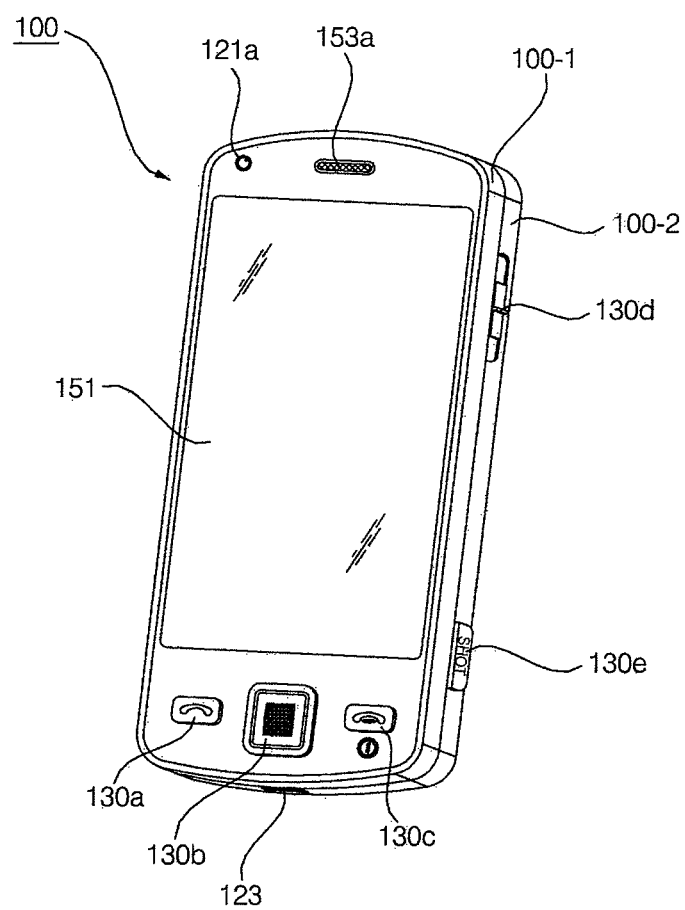
FIG. 2 is a front perspective view illustrating the mobile terminal shown in FIG. 1.
Figure 3:
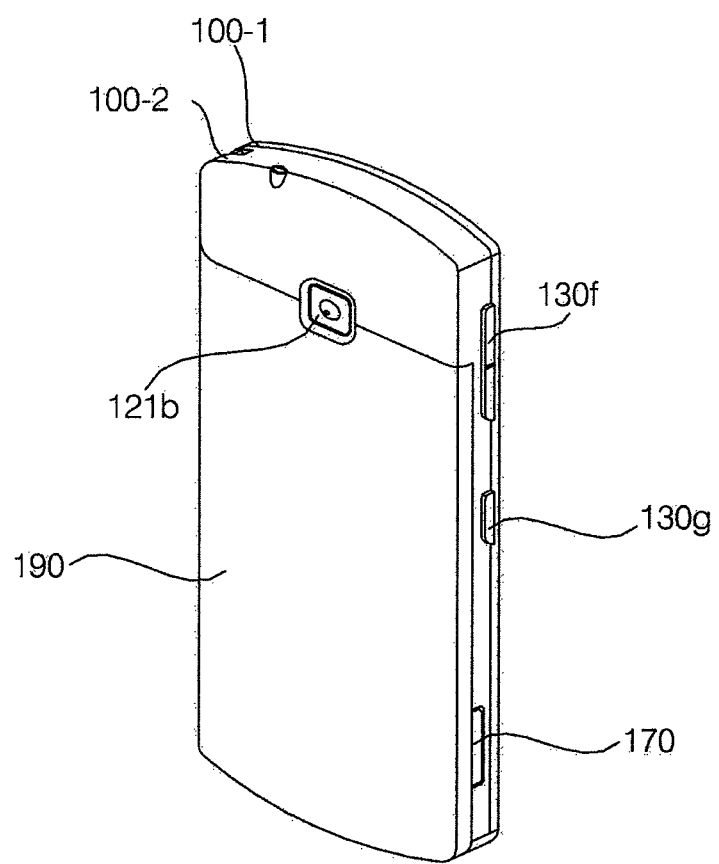
FIG. 3 is a rear perspective view illustrating the mobile terminal shown in FIG. 2.

FIG. 2 is a front perspective view of the mobile terminal 100, and FIG. 3 is a rear perspective view of the mobile terminal 100 of an embodiment of the invention. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153*a*, a first camera 121*a*, and first through third user input modules 130*a* through 130*c* may be disposed in the main body of the mobile terminal 100, and particularly, on the front case 100-1. Fourth and fifth user input modules 130*d* and 130*e* and the microphone 123 may be disposed on one side of the rear case 100-2.

If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153*a* may be implemented as a receiver or a speaker. The first camera 121*a* may be configured to be suitable for capturing a still or moving image of the user. The microphone 123 may be configured to properly receive the user's voice or other sounds.

The first through fifth user input modules 130a through 130e and sixth and seventh user input modules 130f and 130g may be collectively referred to as the user input unit 130, and any means can be employed as the first through seventh user input modules 130a through 130f so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130a through 130c may operate as function keys for entering a command such as start, end, or scroll, the fourth user input module 130d may operate as a function key for selecting an operating mode for the mobile terminal 100, and the fifth user input module 130e may operate as a hot key for activating a special function within the mobile terminal 100.

Referring to FIG. 3, in an embodiment, a second camera 121b may be additionally provided at the rear of the rear case 100-2, and the sixth and seventh user input modules 130f and 130g and the interface unit 170 may be disposed on one side of the rear case 100-2.

The second camera 121b may have an image capture direction which is substantially the opposite to that of the first camera 121a, and may have a different resolution from that of the first camera 121a.

A flash and a mirror may be disposed to be adjacent to the second camera 121b. When an image of a subject is captured with the second camera 121b, the flash may illuminate the subject. The mirror may allow the user to see him- or herself when he or she wants to capture his or her own image by using the second camera 121b.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

The second camera 121b and the other elements that have been described as being provided on the rear case 100-2 may be provided on the front case 100-1. In addition, the first camera 121a may be configured to be rotatable and thus to allow image capturing in various directions. In this case, the second camera 121b may be optional.

Figure 4A:
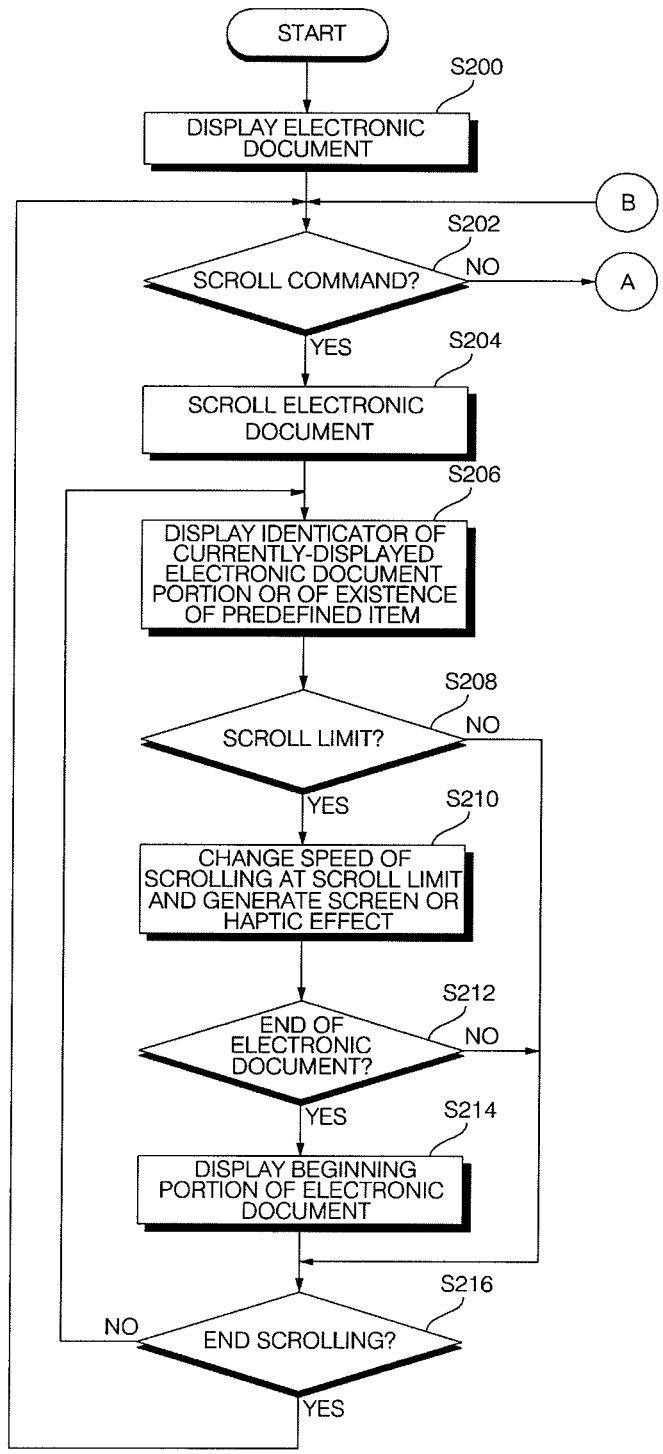
FIGS. 4A and 4B are flowcharts illustrating a method of controlling the operation of a mobile terminal, according to a first exemplary embodiment of the present invention.
Figure 4B:
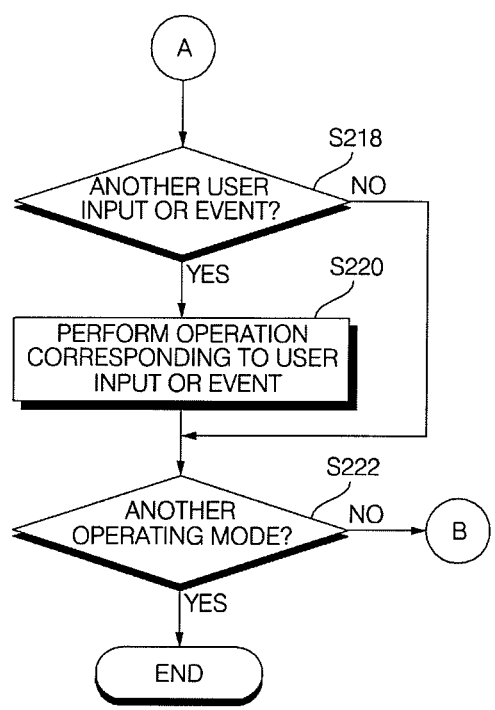

FIGS. 4A and 4B are flowcharts illustrating a method of controlling the operation of a mobile terminal, according to a first exemplary embodiment of the present invention. Referring to FIG. 4A, the controller 180 of an embodiment displays a portion of an electronic document on the display module 151 in response to, for example, a user command (S200). The electronic document may indicate, but is not limited to, the type of document written in an electronic format and/or transmitted by a device such as a computer having a data processing capability. Examples of the electronic document include, but are not limited to, all types of files that can be displayed on a screen, such as a list of items, text, a webpage and a graphic image.

Thereafter, when a scroll command such as a touch-and-flick or a touch-and-drag is detected from the display module 151 (S202), the controller 180 moves the electronic document on the display module 151 and thus displays another portion of the electronic document in response to the scroll command (S204). That is, the controller 180 scrolls the electronic document in accordance with the scroll command.

The term 'touch-and-flick,' as used herein, indicates, but is not restricted to, a user input generated by gently scratching the surface of the display module 151 with a finger. A touch and a touch-and-flick may be differentiated from each other by how long the object (such as a finger) used to generate them is placed in contact with the surface of the display module 151. Not only a touch-and-flick or a touch-and-drag but also a key input or a proximity touch can be used as the scroll command.

The controller 180 displays an indicator of the relative position of the portion of the electronic document currently being displayed on the display module 151 to the whole electronic document on the display module 151 (S206). If there is a keyword entered in advance by a user and the current electronic document portion includes the key word, the controller may also display an indicator of the keyword on the display module 151. For example, the controller 180 may display a speech balloon or a tooltip showing the keyword on the display module 151.

The controller 180 may also display an indicator of a current scroll position on the display module 151. For example, the controller 180 may display the first letter of a word at the current scroll position as the current scroll position indicator, but the present invention is not restricted to this.

If there is a scroll limit set in the electronic document (S208), the controller 180 varies the speed of scrolling the electronic document upon encountering the scroll limit (S210). More specifically, the controller 180 may lower the speed of scrolling the electronic document upon encountering the scroll limit. Alternatively, the controller 180 may even stop the scrolling of the electronic document upon encountering the scroll limit. In this case, when the scrolling of the electronic document stops at the scroll limit, the controller 180 may realign the electronic document around the scroll limit. That is, the controller 180 may realign the electronic document such that the scroll limit can fall at a predefined position on the display module 151.

If the electronic document is a list of a plurality of entries starting with different letters, the scroll limit may be set between the entries. Alternatively, the scroll limit may be set between pages of the electronic document, or at the end of the electronic document. Still alternatively, a frequently-used item in the electronic document may be set as the scroll limit, or the scroll limit may be set at a position in the electronic document selected by the user.

The controller 180 may generate a screen effect or a haptic effect (e.g., vibration) when encountering the scroll limit during the scrolling of the electronic document. Examples of the screen effect include, but are not limited to, a bounce effect, an instant zoom-in or zoom-out effect, a shake effect, or a rotating screen effect. The controller 180 may also generate a haptic effect, along with the screen effect, in response to the scrolling of the electronic document.

If the scroll limit is set at the end of the electronic document (S212), the controller 180 displays the beginning portion of the electronic document next to the end portion of the electronic document in the form of a loop scroll whose beginning and end meet (S214). The rate of the decrease of the speed of scrolling the electronic document upon encountering a scroll limit at the end of the electronic document may be higher than the rate of the decrease of the speed of scrolling the electronic document upon encountering a scroll limit at anywhere else in the electronic document.

Operations 5206 through 5214 are repeatedly performed until the user stops the scrolling of the electronic document (S216).

Referring to FIG. 4B, if a user input to an embodiment, other than the scroll command, is received or an event occurs (S218), the controller 180 controls an operation corresponding to the received user input or the event to be performed (S220). Thereafter, the method returns to operation 5202 unless an operating mode, other than a current operating mode, is selected (S222).

According to the first exemplary embodiment, it is possible to recognize the existence of a scroll limit in an electronic document based on a variation in the speed of scrolling the electronic document and to easily navigate to any desired position in the electronic document.

FIG. 5 is a flowchart illustrating a method of controlling the operation of a mobile terminal, according to a second exemplary embodiment of the present invention. Referring to FIG. 5, the controller 180 displays a portion of an electronic document on the display module 151 in response to, for example, a user command (S230). The electronic document may indicate, but is not limited to, the type of document written in an electronic format and/or transmitted by a device such as a computer having a data processing capability. Examples of the electronic document include, but are not limited to, all types of files that can be displayed on a screen, such as a list of items, text, a webpage and a graphic image.

Thereafter, when a scroll command such as a touch-and-flick or a touch-and-drag is detected on the display module 151 (S232), the controller 180 moves the electronic document on the display module 151 and thus displays another portion of the electronic document in response to the scroll command (S234). That is, the controller 180 scrolls the electronic document in accordance with the scroll command.

Not only a touch-and-flick or a touch-and-drag but also a key input or a proximity touch can be used as the scroll command.

Thereafter, when the scrolling of the electronic document reaches the end of the electronic document (S226), the controller 180 displays the beginning portion of the electronic document next to the end portion of the electronic document, as if the electronic document were a loop scroll whose beginning and end meet (S228).

In this case, how much of the beginning portion of the electronic document appears on the display module 151 corresponds to the distance of the touch-and-flick or the touch-and-drag perceived as the scroll command. The controller 180 may lower the speed of scrolling the electronic document upon encountering the end of the electronic document, or may generate a screen effect or a haptic effect (e.g., vibration) in order to alert a user. Examples of the screen effect include, but are not limited to, a bounce effect, an instant zoom-in or zoom-out effect, a shake effect, or a rotating screen effect. The controller 180 may also generate a haptic effect, along with the screen effect, in response to the scrolling of the electronic document.

Thereafter, if the scroll command is no longer detected, the controller 180 scrolls the electronic document slightly backward and thus realigns the electronic document around the end of the electronic document (S240). As a result, the beginning portion of the electronic document disappears from the display module 151.

The speed of scrolling the electronic document backward may correspond to how much of the beginning portion of the electronic document appears, next to the end portion of the electronic document, on the display module 151. That is, the more the beginning portion of the electronic document appears, the faster the speed of scrolling the electronic document backward becomes.

On the other hand, if the scroll command continues to be received, the controller 180 continues to scroll the electronic document forward.

If a user input, other than the scroll command, is received or an event occurs (S242), the controller 180 controls an operation corresponding to the received user input or the event to be performed (S244). Thereafter, operations 5232 through 5244 are repeatedly performed until an operating mode, other than a current operating mode, is selected (S246).

According to the second exemplary embodiment, it is possible to easily stop the scrolling of an electronic document upon encountering the end of the electronic document and thus to quickly scroll to the end of the electronic document.

The second exemplary embodiment has been described, taking as an example the case when the end of an electronic document is encountered during the scrolling of the electronic document, but the present invention is not restricted to this. That is, the present invention can also be applied to the case when the beginning of an electronic document is encountered during the scrolling of the electronic document. For example, if the beginning of an electronic document is encountered during the scrolling up of the electronic document, the end portion of the electronic document may be displayed ahead of a beginning portion of the electronic document. Then, if no further scroll command is detected, the electronic document is scrolled down so that the end portion of the electronic document can disappear from the display module 151.

Figure 6A:
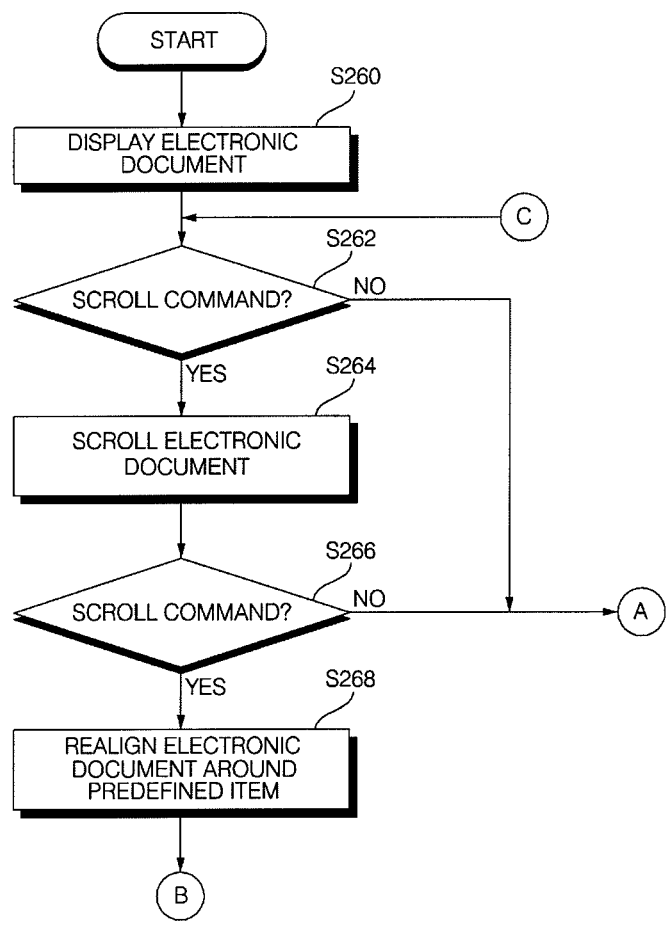
FIGS. 6A and 6B are flowcharts illustrating a method of controlling the operation of a mobile terminal, according to a third exemplary embodiment of the present invention.
Figure 6B:
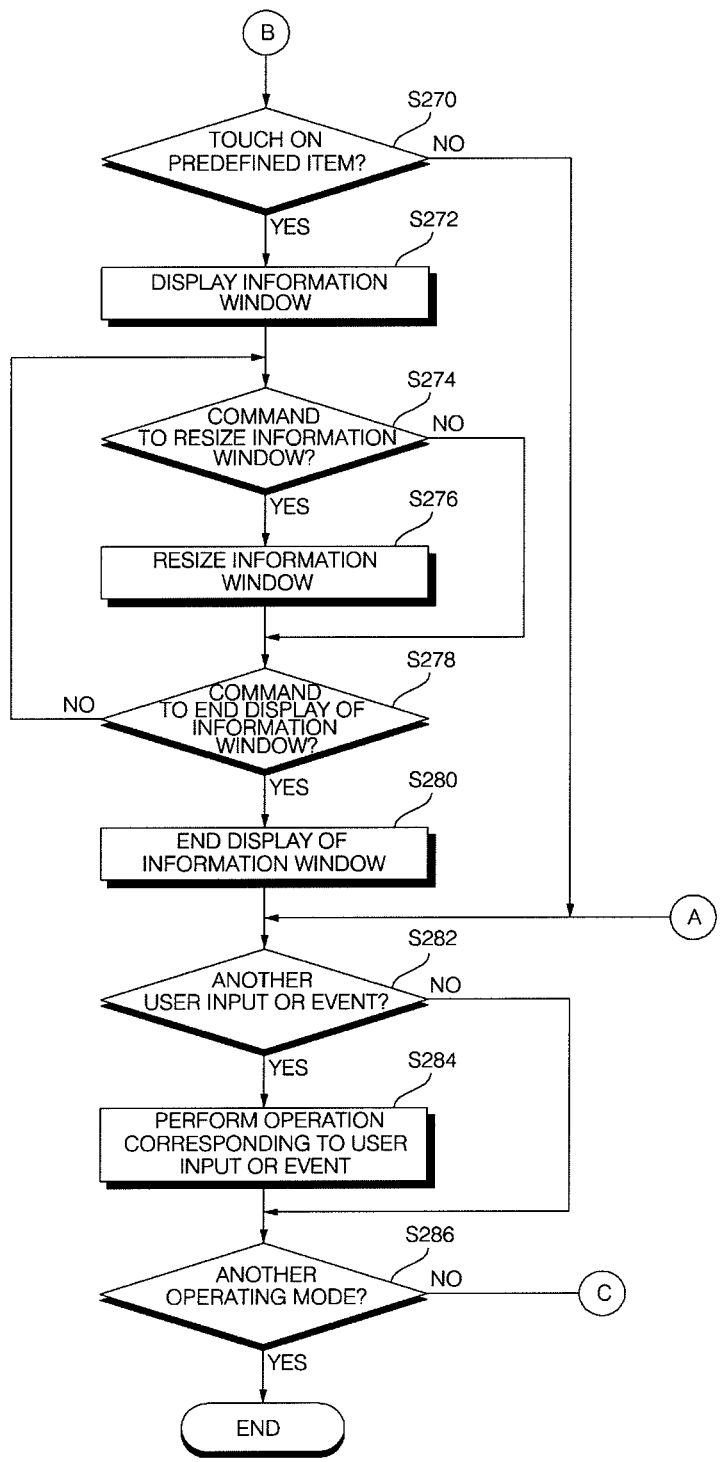

FIGS. 6A and 6B are flowcharts illustrating a method of controlling the operation of a mobile terminal, according to a third exemplary embodiment of the present invention. Referring to FIG. 6A, the controller 180 of an embodiment displays a portion of an electronic document on the display module 151 in response to, for example, a user command (S260).

Thereafter, when a scroll command such as a touch-and-flick, a touch-and-drag, or a proximity touch is detected from the display module 151 (S262), the controller 180 moves the electronic document on the display module 151 and thus displays another portion of the electronic document in response to the scroll command (S264). That is, the controller 180 scrolls the electronic document in accordance with the scroll command.

Thereafter, if a predefined item selected in advance by a user is encountered during the scrolling of the electronic document (S266), the controller 180 realigns the electronic document around the predefined item (S268). That is, the controller 180 scrolls the electronic document backward so that the predefined item can be displayed at a predefined position on the display module 151, e.g., at the center of the display module 151.

In order to alert the user to the encountering of the predefined item, the controller 180 may generate a screen effect or a haptic effect (e.g., vibration). The predefined item may be displayed in a different color or shape from the rest of the electronic document and may thus be able to be easily distinguished from the rest of the electronic document.

The predefined item may be a Favorite item selected by the user or an item that matches a word, a phrase or an image entered by the user. For example, if the user has entered the name of an item to be shopped for in advance and the electronic document includes a word, a phrase or an image corresponding to the entered item name, the controller 180 realigns the electronic document around the word, the phrase, or the image corresponding to the entered item name.

Referring to FIG. 6B, if a touch on the predefined item is detected (S270), the controller 180 displays an information window relevant to the predefined item on the display module 151 (S272).

Thereafter, if a command to resize the information window such as a touch-and-drag on one of the boundaries of the information window is received (S274), the controller 180 changes the size of the information window in accordance with the received command by an amount corresponding to the distance of the touch-and-drag (S276).

If a touch on a hyperlink object, if any, in the information window is detected, the controller 180 may display information on the hyperlink object in the information window. If a scroll command is detected inside the information window, the contents of the information window may be scrolled in response to the scroll command.

If a command to end the display of the information window is received (S278), the controller 180 makes the information window disappear from the display module 151 (S280). A touch or a touch-and-drag on the information window may be used as the command to end the display of the information window.

If a user input, other than a scroll command, is received (S282), the controller 180 controls an operation corresponding to the received user input to be performed (S284). Thereafter, operations S272 through S284 are repeatedly performed until an operating mode, other than a current operating mode, is selected (S286).

According to the third exemplary embodiment, it is possible to automatically stop the scrolling of an electronic document upon encountering a predefined item and realign the electronic document around the predefined item.

The first, second, and third exemplary embodiments will hereinafter be described in further detail with reference to FIGS. 7 through 19.

Figure 7:
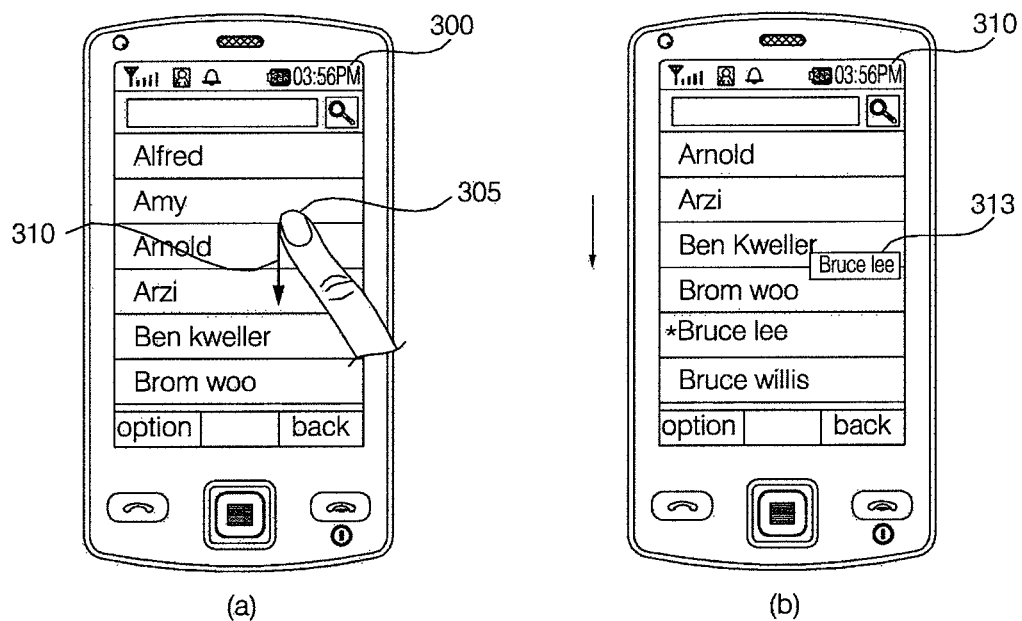
FIGS. 7 through 15 are diagrams illustrating how to control an operation of a mobile terminal on a list screen according to an embodiment of the invention.

FIGS. 7 through 15 illustrate how to control an operation of the mobile terminal 100 on a list screen, according to embodiments of the invention. Referring to FIGS. 7(*a*) and 7(*b*), when a touch-and-flick 305 on a list screen 300 showing a list of a plurality of items is detected, the list is scrolled in the direction of the touch-and-flick, i.e., in a downward direction, as indicated by reference numeral 310. Then, if a predefined item is encountered during the scrolling of the list, an indicator 313 of the predefined item may be displayed on the list screen 300. The indicator 313 may be displayed at a fixed position, regardless of the scrolling of the list, until replaced by another indicator or as long as the predefined item appears on the list screen 300.

Figure 8:
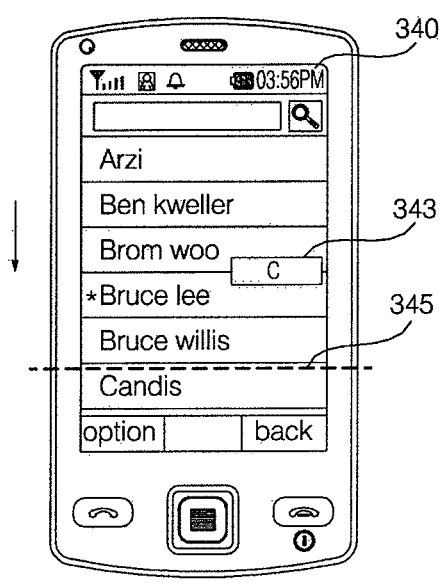

Referring to FIG. 8, in an embodiment, when a list screen 340 showing a list of a plurality of entries starting with different alphabet letters is displayed on the display module 151, a scroll limit 345 may be set between the entries. Then, the scrolling of the list may slow down upon encountering the scroll limit 345. Whenever a new entry starting with a different alphabet letter from those currently being displayed on the list screen 340 appears on the list screen 340, an indicator 454 of the alphabet letter of the new entry may be displayed at a fixed position on the list screen 340.

Figure 9:
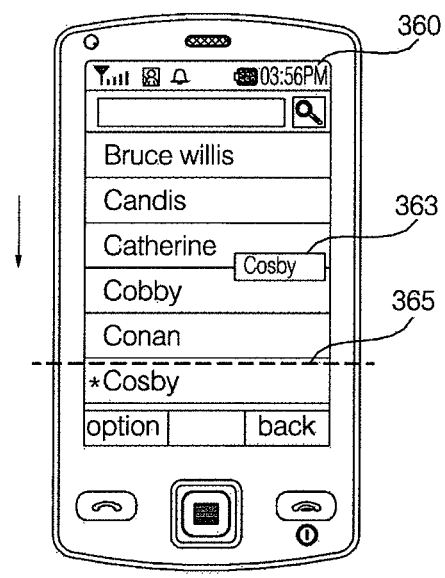

Referring to FIG. 9, in an embodiment, a predefined item in a list in a list screen 360 may be set as a scroll limit 365. In this case, the scrolling of the list may slow down upon encountering the scroll limit 365, and thus, a user can easily identify the existence of the scroll limit 365. The controller 180 may generate a screen effect or a haptic effect (e.g., vibration) when scrolling past the scroll limit 365.

Figure 10:
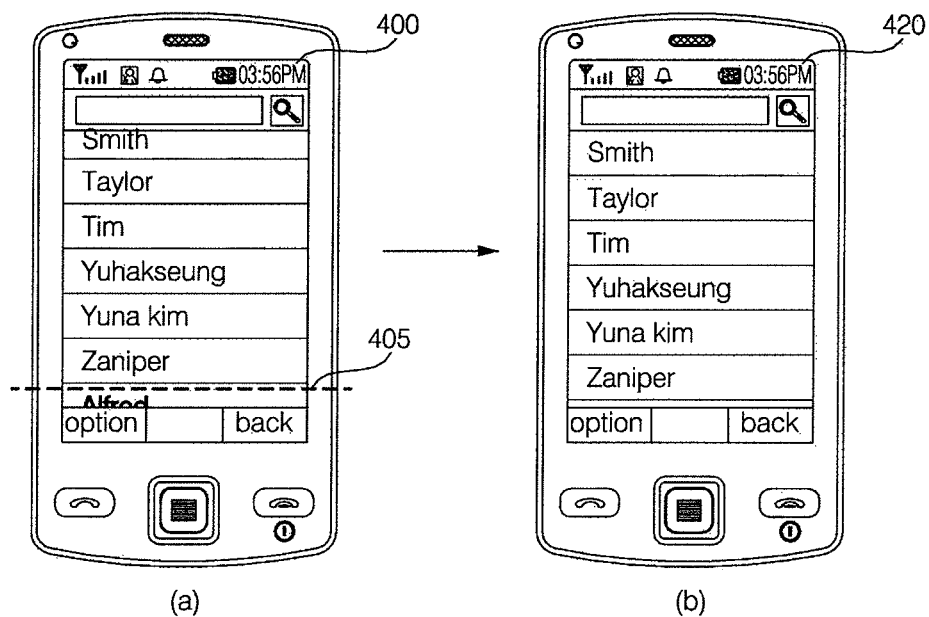

Referring to FIGS. 10(*a*) and 10(*b*), in an embodiment, the scrolling of a list in a list screen 400 may be configured to slow down or even stop upon encountering a scroll limit 405. When the scrolling of the list stops, the list may be realigned around the scroll limit 405, and a shake effect may be applied to a portion of the list screen 400 where the scroll limit 405 is located. Thus, a user can easily identify the encountering of the scroll limit 405 during the scrolling of the list.

Figure 11:
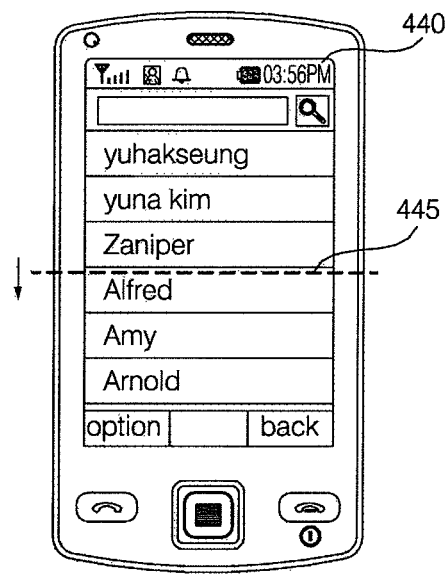

Referring to FIG. 11, a scroll limit 445 of an embodiment may be set at the end of a list in a list screen 440. In this case, the rate at which the scrolling of the list slows down upon encountering the scroll limit 445 may be configured to be higher than the rate at which the scrolling of the list slows down upon encountering a scroll limit at anywhere else in the list. The list may be displayed in the form of a loop scroll whose beginning and end meet. Thus, when the scrolling of the list reaches the end of the list, the scrolling of the list slows down, and a beginning portion of the list appears next to the end of the list.

Figure 12:
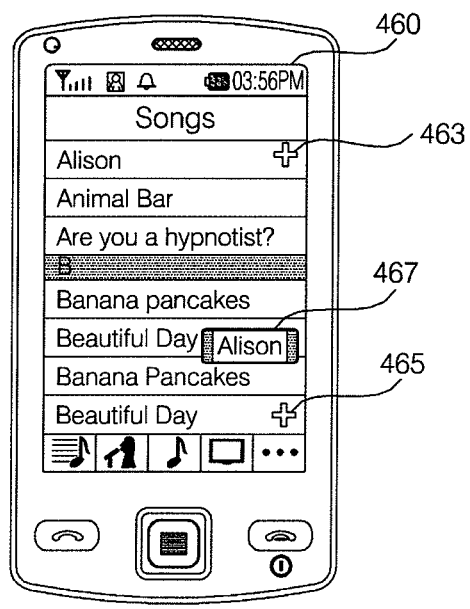

Referring to FIG. 12, in one embodiment, a list in a list screen 460 may be scrolled in response to a touch-and-drag or a touch-and-flick on the list screen 460. When a predefined item appears on the list screen 460 during the scrolling of the list, an indicator 467 of the predefined item may be displayed on the list screen 460. In addition, icons 463 and 465 indicating items in the list that are set as scroll limits may also be displayed on the list screen 460. A scroll limit is the point where the scrolling of the list slows down or even stops, and may be set between entries of a list starting with different letters, between pages of an electronic document, at the beginning or end of an electronic document, or at various other positions in an electronic document arbitrarily chosen by a user.

Figure 13:
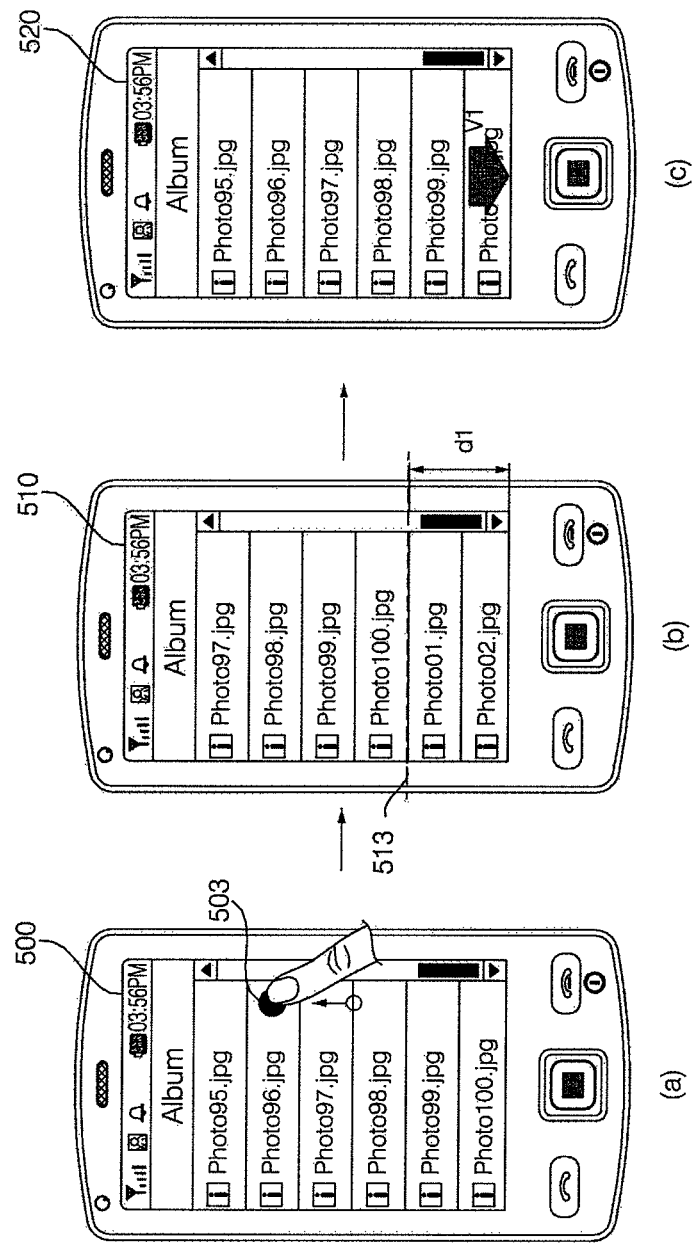

Referring to FIGS. 13(*a*) and 13(*b*), in an embodiment, when a scroll command 503 such as a touch-and-flick or a touch-and-drag is detected on a list screen 500 showing a list of a plurality of items, the list may be scrolled in the direction of the touch-and-flick or the touch-and-drag. If the scrolling of the list reaches an end 513 of the list, a beginning portion of the list may be displayed next to the end 513 of the list. That is, the list may be displayed in the form of a loop scroll.

Referring to a list screen 520 shown in FIG. 13(*c*), if the scroll command 305 is no longer detected, the list may be scrolled in the opposite direction to the direction of the touch-and-flick or the touch-and-drag, and may be realigned around the end 513. Then, a screen effect such as a bounce effect may be applied to the list screen 520.

Figure 14:
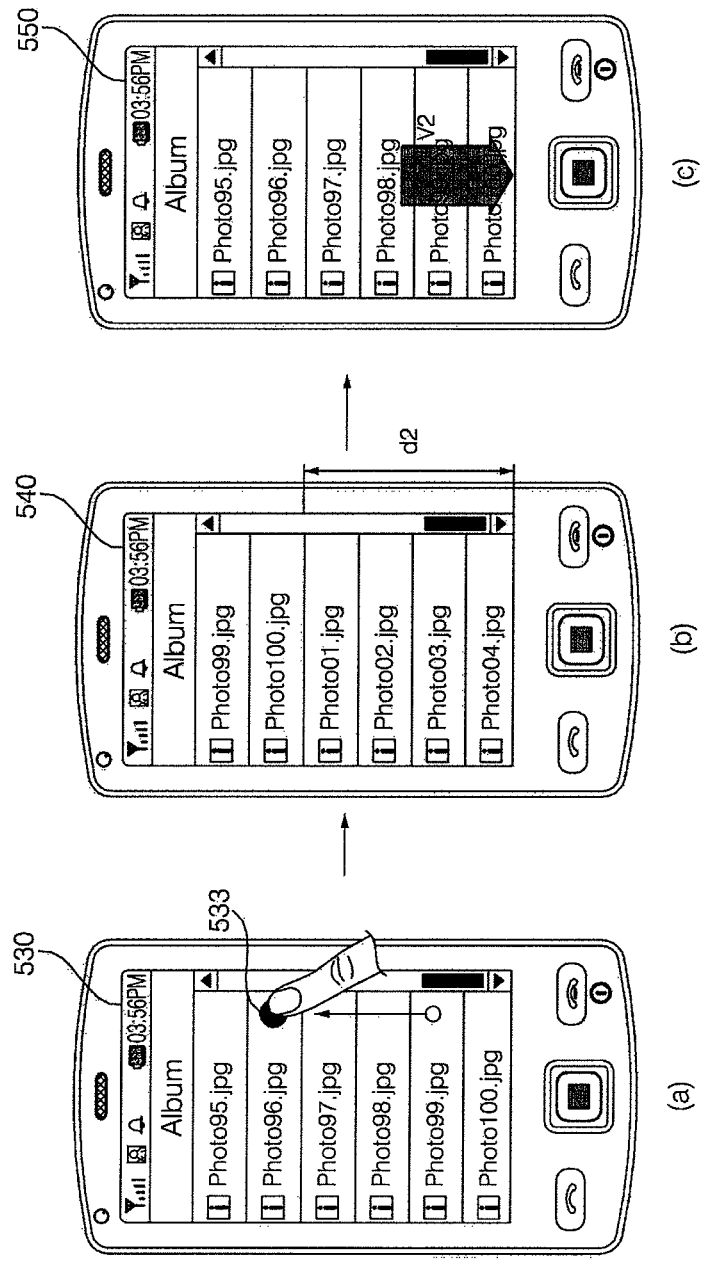
Figure 15:
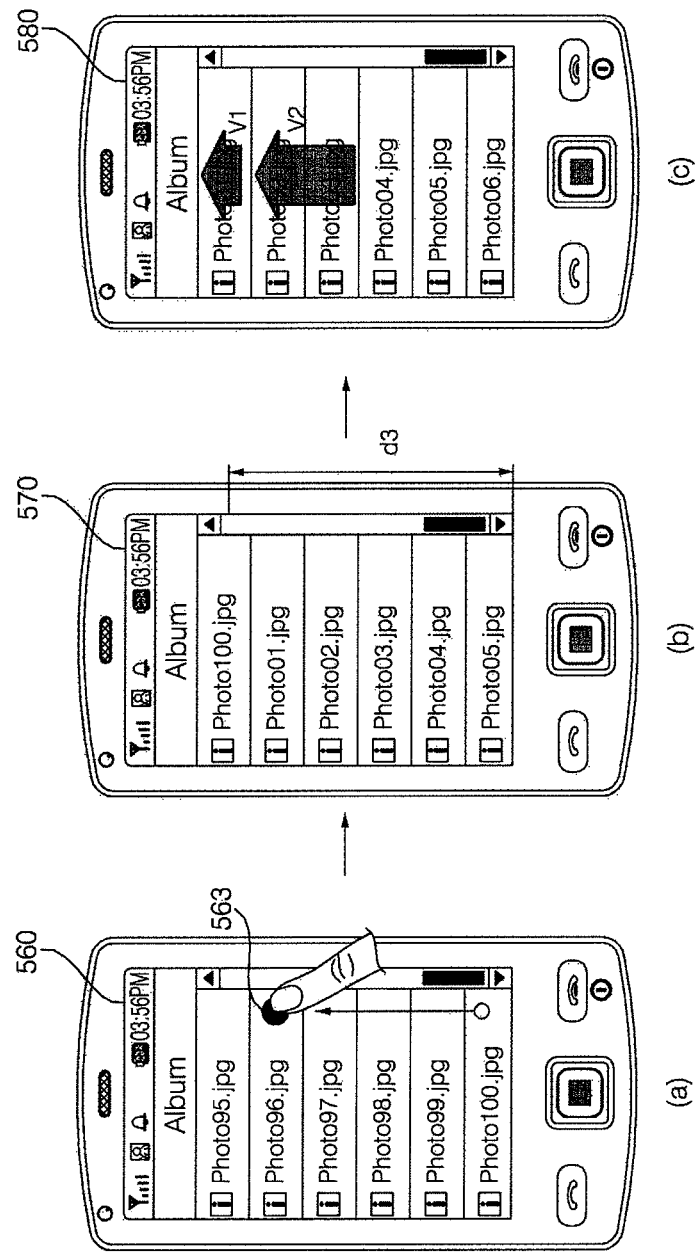

Referring to FIG. 14(*a*), in an embodiment, if the end of a list in a list screen 530 is encountered when scrolling the list forward in response to a scroll command 533 such as a touch-and-flick or a touch-and-drag, the list may be scrolled backward. In this case, the speed of scrolling backward the list may be proportional to the distance of the touch-and-flick or the touch-and-drag.

That is, the list may be scrolled backward at a speed v1 when the distance of the touch-and-flick or the touch-and-drag is d1, as shown in FIGS. 13(*b*) and 13(*c*). On the other hand, when the distance of the touch-and-flick or the touch-and-drag is d2, which is greater than the distance d1, the list may be scrolled backward at a higher speed v2 than the speed v1, as shown in FIGS. 14(b) and 14(c).

If the distance of the touch-and-flick or the touch-and-drag is d3 and the touch-and-flick or the touch-and-drag continues to be detected even after the end of the list is encountered, as shown in FIGS. 15(a) through 15(c), the list may continue to be scrolled forward, instead of being scrolled backward. In this case, the list may be scrolled at the speed v2 first, and the speed of scrolling the list may decrease from v2 to v1 over the course of time.

FIGS. 16 and 17 illustrate how to control an operation of the mobile terminal 100 on a webpage screen. Referring to FIGS. 16(a) and 16(b), if a scroll command 603 such as a touch-and-flick or a touch-and-drag is detected on a webpage screen 600, a webpage displayed in the webpage screen 600 may be scrolled in response to the scroll command 603.

If a predefined item 613 is encountered during the scrolling of the webpage, the scrolling of the webpage stops, and the webpage is moved such that the predefined item 613 can fall at a predefined position on the webpage screen 600, e.g., at the center of the webpage screen 600, as shown in FIG. 16(b).

Thereafter, in an embodiment, if a touch on the predefined item 613 is detected, an information window 620 relevant to the predefined item 613 may be displayed, as shown in FIG. 17(a).

The contents of the information window 620 may be scrolled independently in response to a flick on the information window 620. If a hyperlink object, if any, in the information window is selected, information relevant to the hyperlink object may be displayed.

If a touch-and-drag 613 on one of the boundaries of the information window 620 is detected, the information window 620 may be enlarged or reduced, as shown in FIG. 17(b).

Figure 18:
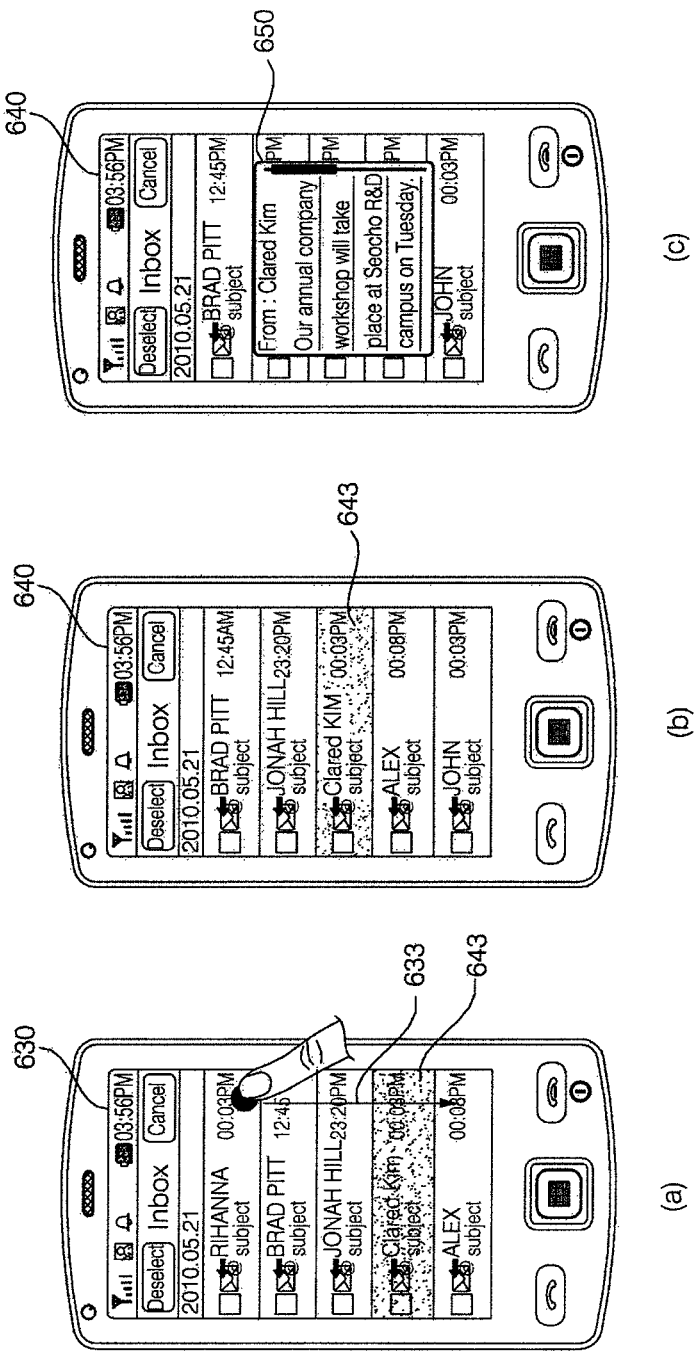
FIG. 18 is diagrams illustrating how to control an operation of a mobile terminal on an email inbox screen according to an embodiment of the invention.

FIG. 18 illustrates how to control an operation of the mobile terminal 100 on an inbox screen according to an embodiment of the invention. Referring to FIG. 18(a), if a scroll command 633 such as a touch-and-flick or a touch-and-drag is detected on an email inbox screen 630, a list of emails in the email inbox screen 630 may be scrolled in response to the scroll command 633. Then, if a predefined email 643 is encountered during the scrolling of the email list, the email list may be scrolled backward such that the predefined email 643 can fall at a predefined position on the email screen 630, e.g., at the center of the email screen 630, as shown in FIG. 18(b). The predefined email 643 may be displayed differently from the other emails in the email list so as to be easily distinguishable.

Thereafter, if a short or long touch on the predefined email 643 is detected, an information window 650 relevant to the predefined email 643 may be displayed, as shown in FIG. 18(c). The size of the information window 650 may be configured to be adjusted in response to, for example, a touch-and-drag on one of the boundaries of the information window 650. The information window 650 may be configured to disappear in response to a command to end the display of the information window 650.

Figure 19:
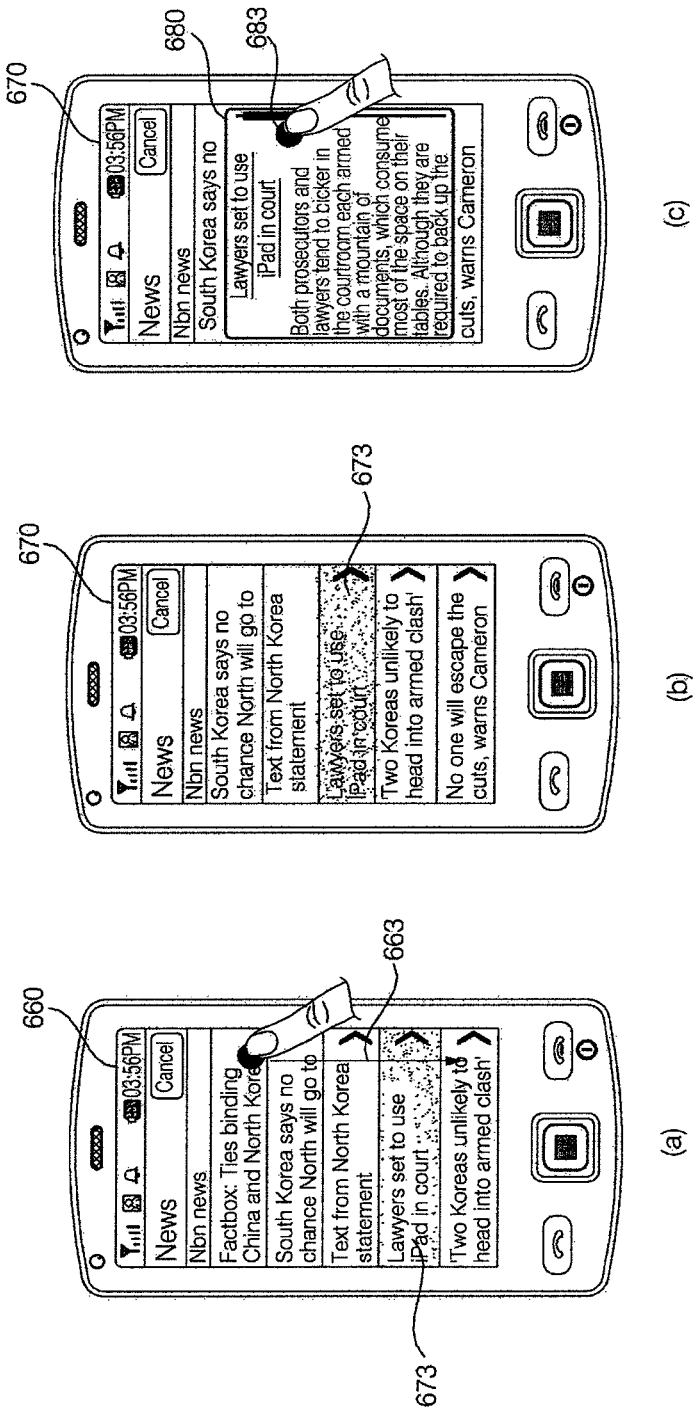
FIG. 19 is diagrams illustrating how to control an operation of a mobile terminal on a display screen showing a news article according to an embodiment of the invention.

FIG. 19 illustrates how, according to an embodiment, to control an operation of the mobile terminal 100 on a display screen showing a news article. Referring to FIGS. 19(a) and 19(b), if a scroll command 663 such as a touch-and-flick or a touch-and-drag is detected on a display screen 660 showing a list of news articles, the news article list may be scrolled in response to the scroll command 663. Then, if a predefined news article 673 is encountered during the scrolling of the news article list, the news article list may be scrolled backward such that the predefined news article 673 can fall at a predefined position on the display screen 660, e.g., at the center of the display screen 660, as shown in FIG. 19(b). The predefined news article 673 may be displayed differently from the other news articles in the news article list so as to be easily distinguishable.

Thereafter, if a short or long touch on the predefined news article 673 is detected, an information window 680 relevant to the predefined news article 673 may be displayed, as shown in FIG. 19(c). The size of the information window 680 may be configured to be adjusted in response to, for example, a touch-and-drag on one of the boundaries of the information window 650. The contents of the information window 680 may be configured to be scrolled independently in response to a scroll command 683 detected inside the information window 680.

In short, referring to FIGS. 7 through 19, if a predefined item is encountered during the scrolling of an electronic document, the scrolling of the electronic document may automatically stop, and the electronic document may be realigned around the predefined item.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to set a scroll limit in an electronic document and thus to automatically slow down or stop the scrolling of the electronic document at the scroll limit. Then, it is possible to effectively alert a user to the existence of the scroll limit by generating a screen effect or a haptic effect. In addition, according to the present invention, it is possible to stop the scrolling of an electronic document upon encountering a predefined item or a predefined portion of the electronic document during the scrolling of the electronic document. Then, it is possible to effectively alert the user to the stopping of the scrolling of the electronic document by generating a screen effect or a haptic effect. Thus, it is possible for the user to quickly search for and navigate to any desired portion of the electronic document.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling the operation of a mobile terminal, the method comprising:
　displaying an electronic document on a display module of the mobile terminal;
　responsive to a scroll command received in an operating mode operable to receive a scroll command, scrolling the electronic document on the display module in a particular direction at a particular speed corresponding to the scroll command;
　decreasing a scrolling speed of the electronic document upon encountering a scroll limit during the scrolling of the electronic document, the scroll limit being set at a position in the electronic document selected in accordance with a user command, wherein the scroll limit is a predefined item, the predefined item being a favorite item selected in advance by a user and being displayed in a different color or shape from other items of the electronic document;

stopping the scrolling of the electronic document upon the first event of 1) receiving a user input other than the scroll command or an event occurs,
2) entering another operating mode, or
3) encountering the scroll limit while the speed of the electronic document is less than a reference speed at the scroll limit;

realigning the electronic document around the scroll limit when the scrolling of the electronic document is stopped at the scroll limit; and displaying a beginning portion of the electronic document next to an end portion of the electronic document when the scrolling of the electronic document reaches the end portion of the electronic document; and responsive to detecting a touch input on a part of the electronic document other than the predefined item while the scrolling is stopped, scrolling the electronic document again in the particular direction.

2. The method of claim 1, further comprising:
generating a screen effect or a haptic effect when scrolling past the scroll limit.

3. The method of claim 1, further comprising: displaying, on the display module, an indicator corresponding to a location of a currently displayed portion of the electronic document or an indicator of a predefined item in the currently displayed portion of the electronic document.

4. The method of claim 1, wherein the scroll command is at least one of a touch-and-flick, a touch-and-drag, and a proximity touch on the display module, and
wherein the electronic document includes a plurality of scroll limits, and the rate of the decrease of the scrolling speed is different depending on the plurality of scroll limits.

5. The method of claim 1, further comprising:
responsive to determining the electronic document has been dragged, in connection with the scroll command, in the particular direction by more than a predefined distance, continuing to scroll the electronic document in the particular direction.

6. A mobile terminal, comprising:
a display module; and
a controller operatively connected to the display module and configured to
display an electronic document on a display module,
receive a scroll command when in an operating mode operable to receive a scroll command,
scroll the electronic document on the display module in a particular direction at a particular speed corresponding to the scroll command,
decrease a scrolling speed of the electronic document upon encountering a scroll limit during the scrolling of the electronic document,
the scroll limit being set at a position in the electronic document selected in accordance with a user command, wherein the scroll limit is a predefined item, the predefined item being a favorite item selected in advance by a user and being displayed in a different color or shape from other items of the electronic document, stop the scrolling of the electronic document upon the first event of 1) receiving a user input other than the scroll command or an event occurs,
2) entering another operating mode, or
3) encountering the scroll limit while the speed of the electronic document is less than a reference speed at the scroll limit, realign the electronic document around the scroll limit when the scrolling of the electronic document is stopped at the scroll limit, and display a beginning portion of the electronic document next to an end portion of the electronic document when the scrolling of the electronic document reaches the end portion of the electronic document, and wherein the controller is further configured to scroll the electronic document again in the particular direction in response to detecting a touch input on a part of the electronic document other than the predefined item while the scrolling is stopped.

7. A method of controlling the operation of a mobile terminal, the method comprising:
displaying an electronic document on a display module of the mobile terminal;
responsive to a scroll command received when in an operating mode operable to receive a scroll command, scrolling the electronic document in a first direction;
decreasing a scrolling speed of the electronic document upon the first event of 1) receiving a user input other than the scroll command or an event occurs,
2) entering another operating mode, or
3) encountering a predefined item during the scrolling of the electronic document, the predefined item being a favorite item selected in advance by a user and being displayed in a different color or shape from other items of the electronic document;

realigning the electronic document around the predefined item by scrolling the electronic document in a second direction different from the first direction so that the predefined item can be displayed at a predefined position on the display module;

responsive to detecting a touch on the predefined item, displaying an information window relevant to the predefined item over the electronic document; and responsive to detecting another scroll command within the displayed information window, scrolling contents of the information window in response to the other scroll command, wherein a scroll limit is the predefined item, and responsive to detecting a touch input on a part of the electronic document other than the predefined item while the scrolling is stopped, scrolling the electronic document back in the first direction.

8. The method of claim 7, further comprising:
generating a screen haptic effect when scrolling past the end portion of the electronic document.

9. The method of claim 7, further comprising: responsive to detecting a touch-and-drag on a boundary of the information window, changing a size of the information window.

10. The method of claim 7, further comprising: responsive to detecting a touch on a hyperlink object in the information window, displaying information relevant to the hyperlink object in the information window.

11. The method of claim 7, further comprising: responsive to detecting a touch outside of the information window, removing the information window from the display module.

12. A mobile terminal, comprising:

a display module; and a controller operatively connected to the display module and configured to display an electronic document, receive a scroll command in an operating mode operable to receive a scroll command, responsive to detecting the scroll command, scrolling the electronic document in a first direction, decreasing a scrolling speed of the electronic document upon the first event of 1) receiving a user input other than the scroll command or an event occurs,
2) entering another operating mode, or
3) encountering a predefined item during the scrolling of the electronic document, the predefined item being a favorite item selected in advance by a user and being displayed in a different color or shape from other items of the electronic document;

realigning the electronic document around the predefined item by scrolling the electronic document in a second direction different from the first direction so that the predefined item can be displayed at a predefined position on the display module;

detect a touch on the predefined item, in response to detecting a touch on the predefined item, display an information window relevant to the predefined item over the electronic document, and scroll contents of the information window in response to detection of another scroll command within the displayed information window, wherein a scroll limit is the predefined item, and wherein the controller is further configured to scroll the electronic document back in the first direction responsive to detecting a touch input on a part of the electronic document other than the predefined item while the scrolling is stopped.

13. The mobile terminal of claim 12, wherein the controller is configured to generating a screen effect or haptic effect when scrolling past the predefined item of the electronic document.

* * * * *